(12) United States Patent
Shinke et al.

(10) Patent No.: US 10,487,234 B2
(45) Date of Patent: Nov. 26, 2019

(54) MATTE CLEAR COATING COMPOSITION FOR ALUMINUM MEMBER

(71) Applicant: KANSAI PAINT CO., LTD., Hyogo (JP)

(72) Inventors: Ryusuke Shinke, Aichi (JP); Yoshinori Kato, Aichi (JP)

(73) Assignee: KANSAI PAINT CO., LTD., Hyogo (JP)

( * ) Notice: Subject to any disclaimer, the term of this patent is extended or adjusted under 35 U.S.C. 154(b) by 0 days.

(21) Appl. No.: 15/786,856

(22) Filed: Oct. 18, 2017

(65) Prior Publication Data

US 2018/0127614 A1 May 10, 2018

(30) Foreign Application Priority Data

Nov. 10, 2016 (JP) ................................ 2016-219402

(51) Int. Cl.
| | | |
|---|---|---|
| *C09D 133/10* | (2006.01) | |
| *C09D 161/26* | (2006.01) | |
| *C08K 3/36* | (2006.01) | |
| *B05D 5/02* | (2006.01) | |
| *C09D 7/40* | (2018.01) | |
| *C09D 161/28* | (2006.01) | |
| *C09D 5/08* | (2006.01) | |
| *B05D 7/00* | (2006.01) | |
| *C08G 12/42* | (2006.01) | |
| *C08F 220/18* | (2006.01) | |
| *B05D 1/02* | (2006.01) | |
| *B05D 5/06* | (2006.01) | |
| *C08L 61/32* | (2006.01) | |

(52) U.S. Cl.
CPC ............ *C09D 133/10* (2013.01); *B05D 5/02* (2013.01); *B05D 7/532* (2013.01); *C08F 220/18* (2013.01); *C08G 12/427* (2013.01); *C08K 3/36* (2013.01); *C09D 5/08* (2013.01); *C09D 7/40* (2018.01); *C09D 7/69* (2018.01); *C09D 161/28* (2013.01); *B05D 1/02* (2013.01); *B05D 5/061* (2013.01); *B05D 2202/25* (2013.01); *B05D 2501/10* (2013.01); *B05D 2502/00* (2013.01); *B05D 2507/00* (2013.01); *B05D 2601/22* (2013.01); *C08K 2201/005* (2013.01); *C08L 61/32* (2013.01)

(58) Field of Classification Search
CPC .......... C09D 7/43; C09D 7/12; C09D 133/10; C09D 161/28; C08K 3/36; B05D 5/02
USPC .................................................. 524/156, 500
See application file for complete search history.

(56) References Cited

U.S. PATENT DOCUMENTS

| | | | | |
|---|---|---|---|---|
| 6,562,474 | B1 * | 5/2003 | Yoshimi ................... | B05D 5/00 428/472.3 |
| 2006/0040061 | A1 * | 2/2006 | Jensen Moller ..... | B05D 3/0254 427/372.2 |
| 2006/0141230 | A1 * | 6/2006 | Miyoshi ............... | C09D 163/00 428/216 |
| 2014/0050928 | A1 | 2/2014 | Gebauer et al. | |

FOREIGN PATENT DOCUMENTS

| | | |
|---|---|---|
| CN | 101219590 | 2/2012 |
| CN | 103180376 | 6/2013 |
| CN | 104830176 | 8/2015 |
| JP | 2003-291255 | 10/2003 |
| JP | 2009-227748 | * 10/2009 |

OTHER PUBLICATIONS

Office Action dated Jul. 19, 2019 in corresponding Chinese Patent Application No. 201711077368.8, with Machine English Translation.

* cited by examiner

*Primary Examiner* — Deve V Hall
(74) *Attorney, Agent, or Firm* — Wenderoth, Lind & Ponack, L.L.P.

(57) ABSTRACT

A matte clear coating composition for an aluminum member, comprising acrylic resin (A) having a hydroxy value of 100 to 200 mgKOH/g; melamine resin (B); silica particles (C) having an average particle size of 1.0 to 15 μm; and polyolefin wax (D) having an average particle size of 10 to 40 μm and a melting point of 145° C. to 180° C., the matte clear coating composition comprising 5 to 20 mass % of silica particles (C) and 3 to 15 mass % of polyolefin wax (D) based on the total solids content of acrylic resin (A) and melamine resin (B). The matte clear coating composition for an aluminum member satisfies both corrosion resistance and abrasion resistance (scratch resistance).

2 Claims, No Drawings

MATTE CLEAR COATING COMPOSITION FOR ALUMINUM MEMBER

TECHNICAL FIELD

The present invention relates to a matte clear coating composition for an aluminum member, in particular to a matte clear coating composition for an aluminum member for use in automobiles, and a matte clear coating composition for an aluminum member that enables production of an aluminum wheel member superior in corrosion resistance and abrasion resistance.

BACKGROUND ART

As a matte clear coating composition to be applied to an aluminum member, a clear coating composition containing silica fine particles as a matting agent has widely been known.

In a general use environment, an aluminum member, such as an aluminum wheel, is subjected to washing or the like for the purpose of cleaning. During the cleaning, the aluminum member is often wiped with a cloth or the like.

However, such wiping using a cloth or the like has been problematic in terms of the abrasion load applied to the coating surface; as a result, the gloss in the abraded portion increases compared with the original matte state (the glossiness increases). Such a defect more significantly occurs when a hard contaminant, such as brake dust is attached to an aluminum wheel of an automobile or the like.

As an example of an aluminum material made of a matte-coated aluminum base material, Patent Document 1 discloses a satin-touch aluminum material in which an effect coating film formed of a coating composition containing an effect pigment, and a coating film with a dried coating film thickness of 10 to 50 μm formed of a clear coating composition containing 5 to 60 parts by mass of spherical resin microparticles with an average particle size d50 of 10 to 50 μm per 100 parts by mass of coating-film-forming resin solids content are sequentially formed on an aluminum base material.

CITATION LIST

Patent Documents

Patent Document 1: JP2003-291255

DISCLOSURE OF INVENTION

Technical Problem

However, the aluminum material disclosed in Patent Document 1, which is matte-coated with a clear coating composition containing spherical resin microparticles having a specific average particle size, has suffered from a problem such that, because of the insufficient abrasion resistance (scratch resistance), when the material is wiped with a cloth or the like, the gloss in the abraded portion increases compared with the original matte state due to the abrasive dynamic load applied to the coating surface.

More specifically, previously suggested aluminum members matte-coated with a clear coating composition were insufficient in terms of ensuring both corrosion resistance and abrasion resistance (scratch resistance).

An object of the present invention is to provide a matte clear coating composition for an aluminum member satisfying both corrosion resistance and abrasion resistance (scratch resistance).

Solution to Problem

The inventors of the present invention carried out extensive research to attain the above object, and found that the above object can be attained by a clear coating composition containing an acrylic resin having a specific hydroxy value range, a melamine resin, silica particles having a specific average particle size range, and a polyolefin wax having a specific average particle size range and a specific melting point range. With this finding, the present inventors completed the present invention.

More specifically, the present invention provides a matte clear coating composition for an aluminum member, comprising acrylic resin (A) having a hydroxy value of 100 to 200 mgKOH/g; melamine resin (B); silica particles (C) having an average particle size of 1.0 to 15 μm; and polyolefin wax (D) having an average particle size of 10 to 40 μm and a melting point of 145° C. to 180° C., the matte clear coating composition comprising 5 to 20 mass % of silica particles (C) and 3 to 15 mass % of polyolefin wax (D) based on the total solids content of acrylic resin (A) and melamine resin (B).

The present invention further provides a method for forming a multilayer coating film, comprising sequentially performing the following steps (1) to (3):

(1) applying undercoating composition (X) to form an undercoating film;

(2) applying, as clear coating composition (Y), the above coating composition onto the undercoating film formed in step (1) to form a clear coating film; and (3) thermally curing the undercoating film and the clear coating film formed in steps (1) and (2) all at once.

Furthermore, the present invention provides an article comprising a coating film formed of the above coating composition.

More specifically, the present invention provides use of a combination of an acrylic resin (A) having a hydroxy value of 100 to 200 mgKOH/g; a melamine resin (B); silica particles (C) having an average particle size of 1.0 to 15 μm; and a polyolefin wax (D) having an average particle size of 10 to 40 μm and a melting point of 145° C. to 180° C. for the manufacture of a matte clear coating composition for an aluminum member, the matte clear coating composition comprising 5 to 20 mass % of silica particles (C) and 3 to 15 mass % of polyolefin wax (D) based on the total solids content of acrylic resin (A) and melamine resin (B).

More specifically, the present invention provides a method for producing a matte clear coating composition for an aluminum member, comprising the step of mixing an acrylic resin (A) having a hydroxy value of 100 to 200 mgKOH/g; a melamine resin (B); silica particles (C) having an average particle size of 1.0 to 15 μm; and a polyolefin wax (D) having an average particle size of 10 to 40 μm and a melting point of 145° C. to 180° C., wherein the matte clear coating composition comprises 5 to 20 mass % of silica particles (C) and 3 to 15 mass % of polyolefin wax (D) based on the total solids content of acrylic resin (A) and melamine resin (B).

Advantageous Effects of Invention

The present invention provides a matte coating film ensuring both corrosion resistance and abrasion resistance (scratch resistance). With these characteristics, the matte coating film of the present invention ensures excellent corrosion resistance and excellent resistance to abrasive kinetic loads due to wiping, and therefore maintains the same matte surface even when a kinetic load is applied.

Accordingly, since the matte clear coating composition for an aluminum member of the present invention, and an aluminum member such as an aluminum wheel coated with the clear coating composition of the present invention ensure both corrosion resistance and abrasion resistance (scratch resistance), they are significantly industrially valuable.

BEST MODE FOR CARRYING OUT THE INVENTION

Hereinbelow, the matte clear coating composition and the coating film forming method of the present invention are more specifically explained.

However, the embodiments below are only examples of preferred embodiments, and the present invention is not limited to these embodiments.

The matte clear coating composition of the present invention (which hereinafter may be abbreviated as "the present coating composition") is a matte clear coating composition for an aluminum member comprising an acrylic resin (A) having a hydroxy value of 100 to 200 mgKOH/g; a melamine resin (B); silica particles (C) having an average particle size of 1.0 to 15 μm; and a polyolefin wax (D) having an average particle size of 10 to 40 μm and a melting point of 145° C. to 180° C., wherein the matte clear coating composition comprises 5 to 20 mass % of silica particles (C) and 3 to 15 mass % of polyolefin wax (D) based on the total solids content of acrylic resin (A) and melamine resin (B).

Acrylic Resin (A)

Acrylic resin (A) of the coating composition of the present invention can be produced by copolymerizing a hydroxy-containing unsaturated monomer and other unsaturated monomers through an ordinary method.

Examples of hydroxy-containing unsaturated monomers include $C_{2-8}$ hydroxyalkyl esters of acrylic or methacrylic acid, such as 2-hydroxyethyl (meth)acrylate, 3-hydroxypropyl (meth)acrylate, and hydroxybutyl (meth)acrylate; monoesters of polyether polyols, such as polyethylene glycol, polypropylene glycol, and polybutylene glycol, with unsaturated carboxylic acids, such as (meth)acrylic acid; monoethers of polyether polyols, such as polyethylene glycol, polypropylene glycol, and polybutylene glycol, with (meth)acrylic acid hydroxyalkyl esters, such as 2-hydroxyethyl (meth)acrylate; monoesterification products or diesterification products of acid anhydride group-containing unsaturated compounds, such as maleic anhydride and itaconic anhydride, with glycols, such as ethylene glycol, 1,6-hexanediol, and neopentyl glycol; hydroxyalkyl vinyl ethers, such as hydroxyethyl vinyl ether; allyl alcohol and the like; 2-hydroxypropyl (meth)acrylate; adducts of α,β-unsaturated carboxylic acids with monoepoxy compounds, such as "Cardura E10P" (trade name; produced by Hexion Specialty Chemicals; a glycidyl ester of a synthetic highly branched saturated fatty acid) and α-olefin epoxide; adducts of glycidyl (meth)acrylate with monobasic acids, such as acetic acid, propionic acid, p-tert-butylbenzoic acid, and aliphatic acids; adducts of the above hydroxy-containing unsaturated monomers with lactones (e.g., ε-caprolactone, γ-valerolactone); and the like. These hydroxy-containing unsaturated monomers may be used solely or in a combination of two or more. Further, other unsaturated monomers shown below may also be used solely or in a combination of two or more.

In this specification, "(meth)acrylate" is the general name of acrylates and methacrylates and "(meth)acrylic acid" is the general name of acrylic acids and methacrylic acids.

Examples of other unsaturated monomers include carboxy-containing unsaturated monomers, (meth)acrylic acid esters, vinyl ethers or allyl ethers, olefinic compounds and diene compounds, hydrocarbon ring-containing unsaturated monomers, nitrogen-containing unsaturated monomers, epoxy-containing unsaturated monomers, hydrolyzable alkoxysilyl group-containing acrylic monomers, and the like.

Examples of carboxy-containing unsaturated monomers include compounds containing, in each molecule, one or more carboxy groups and one unsaturated bond, such as (meth)acrylic acid, crotonic acid, itaconic acid, maleic acid, maleic anhydride, fumaric acid, 2-carboxyethyl (meth)acrylate, 3-carboxypropyl (meth)acrylate, 5-carboxypentyl (meth)acrylate, and the like.

Examples of (meth)acrylic acid esters include $C_{1-24}$ alkyl esters or cycloalkyl esters of acrylic or methacrylic acid, such as methyl acrylate, ethyl acrylate, propyl acrylate, isopropyl acrylate, n-butyl acrylate, isobutyl acrylate, tert-butyl acrylate, hexyl acrylate, 2-ethylhexyl acrylate, n-octyl acrylate, decyl acrylate, lauryl acrylate, stearyl acrylate, cyclohexyl acrylate, methyl methacrylate, ethyl methacrylate, n-propyl methacrylate, isopropyl methacrylate, n-butyl methacrylate, isobutyl methacrylate, tert-butyl methacrylate, hexyl methacrylate, 2-ethylhexyl methacrylate, octyl methacrylate, decyl methacrylate, lauryl methacrylate, stearyl methacrylate, and cyclohexyl methacrylate; $C_{2-18}$ alkoxyalkyl esters of acrylic or methacrylic acid, such as methoxybutyl acrylate, methoxybutyl methacrylate, methoxyethyl acrylate, methoxyethyl methacrylate, ethoxybutyl acrylate, and ethoxybutyl methacrylate; and the like.

Examples of vinyl ethers or allyl ethers include ethyl vinyl ether, n-propyl vinyl ether, isopropyl vinyl ether, butyl vinyl ether, tert-butyl vinyl ether, pentyl vinyl ether, hexyl vinyl ether, octyl vinyl ether, and like chain-like alkyl vinyl ethers; cyclopentyl vinyl ether, cyclohexyl vinyl ether, and like cycloalkyl vinyl ethers; phenyl vinyl ether, trivinyl benzyl ether, and like aryl vinyl ethers; benzyl vinyl ether, phenethyl vinyl ether, and like aralkyl vinyl ethers; allyl ethyl ether and like allyl ethers; and the like.

Examples of olefinic compounds and diene compounds include ethylene, propylene, butylene, vinyl chloride, butadiene, isoprene, chloroprene, and the like.

Examples of hydrocarbon ring-containing unsaturated monomers include styrene, α-methylstyrene, phenyl (meth)acrylate, phenylethyl (meth)acrylate, phenylpropyl (meth)acrylate, benzyl (meth)acrylate, phenoxyethyl (meth)acrylate, cyclohexyl (meth)acrylate, 2-acryloyloxyethylhydrogen phthalate, 2-acryloyloxypropylhydrogen phthalate, 2-acryloyloxypropylhexahydrohydrogen phthalate, 2-acryloyloxypropyltetrahydrohydrogen phthalate, ester of p-tert-butyl-benzoic acid with hydroxyethyl (meth)acrylate, dicyclopentenyl (meth)acrylate, and the like.

Examples of nitrogen-containing unsaturated monomers include N,N-dimethylaminoethyl (meth)acrylate, N,N-diethylaminoethyl (meth)acrylate, N-t-butylaminoethyl (meth)acrylate, and like nitrogen-containing alkyl (meth)acrylates; acrylamide, methacrylamide, N-methyl (meth)acrylamide, N-ethyl (meth)acrylamide, N,N-dimethyl (meth)acrylamide, N,N-dimethylaminopropyl (meth)acrylamide, N,N-dimethylaminoethyl (meth)acrylamide, and like polymerizable amides; 2-vinylpyridine, 1-vinyl-2-pyrrolidone, 4-vinylpyridine, and like aromatic nitrogen-containing monomers; acrylonitrile, methacrylonitrile, and like polymerizable nitriles; allylamines; and the like.

Examples of epoxy-containing unsaturated monomers include glycidyl (meth)acrylate, allyl glycidyl ether and like aliphatic epoxy-containing unsaturated monomers, and 3,4-epoxycyclohexylmethyl (meth)acrylate and like alicyclic epoxy-containing unsaturated monomers.

Examples of hydrolyzable alkoxysilyl group-containing acrylic monomers include γ-(meth)acryloyloxypropyltrimethoxysilane, γ-(meth)acryloyloxypropylmethyldimethoxysilane, β-(meth)acryloyloxyethyltrimethoxysilane, γ-(meth)acryloyloxypropyltriethoxysilane, γ-(meth)acryloyloxypropylmethyldiethoxysilane, and the like.

Examples also include vinyl compounds such as vinyl acetate, vinyl propionate, vinyl chloride, vinyl versatates, and the like. Examples of vinyl versatates include commercially available products "VEOVA 9" and "VEOVA 10," (Japan Epoxy Resin Co., Ltd.), and the like.

The synthesis of acrylic resin (A) can be carried out by a generally employed method for polymerization of unsaturated monomers. Considering the versatility, cost, etc., solution radical polymerization in an organic solvent is the most suitable. A desired product can be easily obtained, for example, by carrying out a copolymerization reaction at a temperature of about 60 to about 150° C. in a solvent in the presence of a polymerization initiator. Examples of solvents include xylene, toluene, and like aromatic solvents; methyl ethyl ketone, methyl isobutyl ketone, and like ketone solvents; ethyl acetate, butyl acetate, isobutyl acetate, 3-methoxy butyl acetate, and like ester solvents; n-butanol, isopropyl alcohol, and like alcohol solvents; and the like. Examples of polymerization initiators include azo catalysts, peroxide catalysts, and the like.

Acrylic resins (A) may be used solely or in a combination of two or more.

The hydroxy value of acrylic resin (A) is preferably in a range of 100 to 200 mgKOH/g, particularly 120 to 180 mgKOH/g, and further particularly 120 to 160 mgKOH/g in terms of coating film performance such as abrasion resistance. In this specification, the hydroxy value (mg KOH/g) is obtained by a potassium-hydroxide-based conversion of the amount of the hydroxy group per gram (solids content) of a sample, which is expressed as mg of potassium hydroxide. The molecular weight of potassium hydroxide is assumed to be 56.1.

To achieve an excellent finished appearance and excellent coating film performance, such as abrasion resistance, the weight-average molecular weight of acrylic resin (A) is preferably in a range of 4000 to 20000, particularly 6000 to 16000, and further particularly 8000 to 12000.

In this specification, the number average molecular weight and weight average molecular weight are determined by measuring the retention time (retention volume) using Gel Permeation Chromatography (GPC), and converting the values into the molecular weight of polystyrene using the retention time (retention volume) of the standard polystyrene, whose molecular weight is known, measured under the same conditions. More specifically, the number average molecular weight and the weight average molecular weight can be measured using an HLC8120GPC gel permeation chromatography apparatus (trade name; Tosoh Corporation) together with four columns "TSKgel G-4000HXL," "TSKgel G-3000HXL," "TSKgel G-2500HXL," and "TSKgel G-2000HXL" (trade names; Tosoh Corporation), and a differential refractometer as a detector under the following conditions: mobile phase, tetrahydrofuran; measurement temperature, 40° C.; and flow rate, 1 mL/min.

When acrylic resin (A) has carboxyl groups, the acid value is preferably in a range of 1 to 40 mgKOH/g, particularly 3 to 30 mgKOH/g, and further particularly in a range of 5 to 20 mgKOH/g, in terms of finished appearance and coating film performance, such as abrasion resistance.

The glass transition temperature (Tg) of acrylic resin (A) is preferably in a range of −20 to 30° C., particularly −10 to 30° C., and further particularly in a range of 0 to 30° C., in terms of finished appearance and coating film performance, such as abrasion resistance.

Melamine Resin (B)

Any melamine resins used for known coating compositions may be used as melamine resin (B). Examples of melamine resin include partially or fully methylolated known melamine resins obtained by reacting melamine with aldehyde.

Examples of aldehyde include formaldehyde, paraformaldehyde, acetaldehyde, and benzaldehyde. These aldehydes may be used solely or in a combination of two or more.

Further, those obtained by etherification of the above methylolated melamine resins with alcohols can also be used. Examples of alcohols that can be used in the etherification include methyl alcohol, ethyl alcohol, n-propyl alcohol, isopropyl alcohol, n-butyl alcohol, isobutyl alcohol, 2-ethylbutanol, 2-ethylhexanol, and the like. These alcohols may be used solely or in a combination of two or more.

Examples of melamine resin (B) include methylolmelamines such as dimethylolmelamine, trimethylolmelamine, tetramethylolmelamine, pentamethylolmelamine, and hexamethylolmelamine; alkyl-etherified products or condensates of these methylolmelamines; and condensates of alkyl-etherified products of methylolmelamines. These melamine resins (B) may be used solely or in a combination of two or more.

As melamine resin (B), melamine resins containing a butyl ether group etherified using n-butyl alcohol may be suitably used in terms of coating film performance, such as corrosion resistance. In particular, melamine resins in which all alkyl ether groups in the melamine resin are butyl ether groups may be more suitably used.

In terms of finished appearance and coating film performance, such as abrasion resistance, melamine resins (B) having a weight-average molecular weight in a range of 600 to 6000, particularly 800 to 5000, and further particularly 1000 to 4000 may be suitably used.

Melamine resin (B) may be obtained from commercial suppliers. Examples include commercially available products such as "Cymel 323," "Cymel 325," "Cymel 327," "Cymel 350," "Cymel 370," "Cymel 380," "Cymel 385," "Cymel 212," "Cymel 251," "Cymel 254," "Mycoat 776" (Nihon Cytec Industries Inc.); "Resimene 735," "Resimene 740," "Resimene 741," "Resimene 745," "Resimene 746," and "Resimene 747" (Monsanto Co., Ltd.); "SUMIMAL M55," "SUMIMAL M30W," and "SUMIMAL M50W" (Sumitomo Chemical Co., Ltd.); "U-Van 20SB," "U-Van 20SE-60," and "U-Van 28-60" (Mitsui Chemicals, Inc.); and the like.

Melamine resins (B) may be used solely, or in a combination of two or more.

In terms of finished appearance and coating film curability or the like, the amounts of acrylic resin (A) and melamine resin (B) in the present coating composition are preferably such that, based on the total solids content of acrylic resin (A) and melamine resin (B), the amount of acrylic resin (A)

is in a range of 50 to 90 mass %, and particularly 60 to 80 mass %, and the amount of melamine resin (B) is preferably in a range of 10 to 50 mass %, and particularly 20 to 40 mass %.

Silica Particles (C)

Examples of silica particles (C) include dry silica and wet silica. Dry silica is suitably used because it can ensure high scattering effect and increase the range of glossiness value adjustment. Further, in terms of its dispersibility in the coating composition, dry silica with a surface modified with an organic compound may be suitably used. These silica particles (C) may be used solely or in a combination of two or more.

The average particle size of silica particles (C) is preferably in a range of 1.0 to 15 μm, particularly 1.0 to 13 μm, and further particularly 2.0 to 13 μm, in terms of finished appearance of matte coating, abrasion resistance, and storage stability of the coating composition.

In this specification, the average particle size of silica particles (C) and polyolefin wax (D) is a D50 value of particle size distribution measured by using a laser diffraction scattering method. A D50 value refers to a particle size in which the cumulative particle size distribution from the small particle size side becomes 50% in a volume-based particle size distribution. In this specification, the volume-based particle size distributions of silica particles (C) and polyolefin wax (D) may be measured by a laser diffraction scattering method using a Microtrack NT3300 particle size distribution analyzer (trade name, Nikkiso Co., Ltd.). In this step, as a pretreatment, silica particles (C) and polyolefin wax (D) were added to a mixed solution of acetone and isopropyl alcohol and the mixture was subjected to ultrasonic treatment for a minute to disperse them; the particle concentration was thus adjusted within a predetermined transmittance range set in the device.

Examples of commercially available silica particles (C) include silica particles having an average particle size of 1.0 to 15 μm selected from Sylysia Series, Sylophobic Series, Sylosphere Series (Fuji Silysia Chemical Co., Ltd.), Syloid Series (Grace Japan KK), Acematt Series (Evonik Degussa Japan Co., Ltd.), Nipgel Series, Nipsil Series (Nippon Silica), Mizukasil Series (Mizusawa Industrial Chemicals, Ltd.), Carplex Series (Shionogi Co., Ltd), Aerosil Series (Nippon Aerosil), Radiolite Series (Showa Chemical Industry Co., Ltd.), and the like.

The content of silica particles (C) is preferably in a range of 5 to 20 mass %, particularly 5 to 18 mass %, and further particularly 5 to 15 mass % based on the total solids content of acrylic resin (A) and melamine resin (B), in terms of finished appearance of matte coating, abrasion resistance, and storage stability of the coating composition.

Polyolefin Wax (D)

In the coating composition of the present invention, polyolefin wax (D) is used to impart a slip property to the coating film, thereby improving abrasion resistance.

For polyolefin wax (D), those obtained by known methods, such as a production method through polymerization of holopolymer or a production method through the decomposition of a high-molecular-weight polymer, may be used.

Examples of polyolefin wax (D) include polyethylene wax and polypropylene wax. These examples of polyolefin wax (D) may be used solely or in a combination of two or more.

The average particle size of polyolefin wax (D) is preferably in a range of 10 to 40 μm, particularly 10 to 37 μm, further particularly 10 to 34 μm, and further particularly in a range of 12 to 34 μm in terms of the finished appearance of the matte coating, the abrasion resistance, and the storage stability of the coating composition.

The melting point of polyolefin wax (D) is preferably in a range of 145 to 180° C., particularly in a range of 145 to 175° C., and further particularly in a range of 145 to 170° C. in terms of finished appearance of matte coating and abrasion resistance.

Further, in the coating composition of the present invention, the melting point of polyolefin wax (D) is preferably equal to or more than the coating composition baking temperature in terms of abrasion resistance. This ensures retention of a particulate state during the baking.

The content of polyolefin wax (D) is preferably in a range of 3 to 15 mass %, particularly 3 to 14 mass %, and further particularly 4 to 12 mass % based on the total solids content of acrylic resin (A) and melamine resin (B) in terms of finished appearance of matte coating, abrasion resistance, and storage stability of the coating composition.

Phosphate Group-containing Compound (E)

In the coating composition of the present invention, phosphate group-containing compound (E) may be used as necessary in terms of improvement in curability and adherence of the clear coating film.

Examples of phosphate group-containing compound (E) include phosphoric acid; monoalkyl phophoric acids, such as mono-n-propyl phosphoric acid, monoisopropyl phosphoric acid, mono-n-butyl phosphoric acid, monoisobutyl phosphoric acid, mono-tert-butyl phosphoric acid, monooctyl phosphoric acid and monodecyl phosphoric acid; dialkyl phosphoric acids, such as di-n-propyl phophoric acid, diisopropyl phosphoric acid, di-n-butyl phosphoric acid, diisobutyl phosphoric acid, di-tert-butyl phosphoric acid, dioctyl phosphoric acid and didecyl phosphoric acid; monoalkyl phosphorous acids, such as mono n-propyl phosphorous acid, monoisopropyl phosphorous acid, mono-n-butyl phosphorous acid, monoisobutyl phosphorous acid, mono-tert-butyl phosphorous acid, monooctyl phosphorous acid and monodecyl phosphorous acid; dialkyl phosphorous acids, such as di-n-propyl phosphorous acid, diisopropyl phosphorous acid, di-n-butyl phosphorous acid, diisobutyl phosphorous acid, di-tert-butyl phosphorous acid, dioctyl phosphorous acid and didecyl phosphorous acid; and phosphate group-containing acrylic resins. These phosphate group-containing compounds (E) may be used solely or in a combination of two or more.

Among these, in particular, in terms of coating film performance such as weather resistance, phosphate group-containing acrylic resin (E1) may be suitably used.

The phosphate group-containing acrylic resin (E1) can be synthesized by a usual method using phosphate group-containing unsaturated monomers and other unsaturated monomers, as in the case of the above-described acrylic resin (A).

Examples of phosphate group-containing unsaturated monomers include acidic phosphoric acid ester-based monomers, such as 2-(meth)acryloyloxyethyl acid phosphate, 2-(meth)acryloyloxypropyl acid phosphate, 2-(meth)acryloyloxy-3-chloropropyl acid phosphate, and 2-methacryloyloxyethylphenyl phosphoric acid. As specific trade names, KAYAMER PM-21 manufactured by Nippon Kayaku Co., Ltd. and LIGHT ESTER PM manufactured by Kyoei Yushi Co., Ltd. and the like can be used. These phosphate group-containing unsaturated monomers may be used solely or in a combination of two or more.

Examples of other unsaturated monomers include hydroxy-containing unsaturated monomers and other unsaturated monomers listed above as examples of acrylic resin (A).

In the coating composition of the present invention, the phosphate group-containing acrylic resin is not acrylic resin (A) but phosphate group-containing compound (E).

The amount of phosphate group-containing unsaturated monomer in phosphate group-containing acrylic resin (E1) is preferably 1 to 20 mass %, and particularly 5 to 15 mass %, based on the total amount of monomer components constituting phosphate group-containing acrylic resin (E1).

The weight-average molecular weight of phosphate group-containing acrylic resin (E1) is preferably in a range of 3000 to 30000, particularly 5000 to 25000, and further particularly 10000 to 20000 in terms of finished appearance and coating film performance.

The amount of phosphate group-containing compound (E) is preferably 10 mass % or less, particularly 1 to 6 mass %, and further particularly 2 to 5 mass % based on the total solids content of acrylic resin (A) and melamine resin (B).

These phosphate group-containing compounds (D) may be used solely or in a combination of two or more.

Further, the present coating composition may contain coloring pigments, effect pigments, dyes, and the like insofar as the transparency of the coating composition is not impaired. Still further, extender pigments, catalysts other than phosphate group-containing compound (E), UV absorbers, light stabilizers, rheology control agents, antifoaming agents, rust proofing agents, surface control agents, organic solvents and the like may also be suitably contained.

The solids content concentration of the present coating composition is generally preferably 35 to 70 mass %, more preferably 40 to 70 mass %, and further preferably 45 to 65 mass %.

The present coating composition may be applied with a coating method known per se, for example, airless spray coating, air spray coating, a rotary atomizing coating device and the like. Electrostatic application may be performed in these coating methods. The thickness of the coating film is preferably such that the cured film thickness is generally in a range of about 10 to 60 μm, and preferably in a range of 25 to 50 μm.

The present coating composition may be heated by a general coating film thermally curing means, such as hot air heating, infrared heating, or high-frequency heating. The coating composition may be cured by heating at about 120 to about 160° C., and preferably about 125 to about 140° C. for about 20 to 40 minutes.

Substrate

Substrates to which the coating composition of the present invention can be applied are not limited insofar as the substrates are aluminum members. Examples thereof include aluminum members used for automobiles, such as cars, trucks, vans, buses, motorcycles, and the like, and aluminum members for home appliances, such as mobile phones, audio devices, and the like. Of these, aluminum members for automobiles are preferable. In particular, aluminum wheels for automobiles serving as an attaching member of automobile tubes or tires are preferable.

Generally, aluminum wheels for automobiles contain aluminum as a major component. Examples of substrates also include aluminum wheels made from alloys containing magnesium, silicon, or the like (e.g., AC4C alloys and AC4CH alloys that are classified as an Al—Si—Mg-based alloy).

Generally, aluminum wheels are made by molding an aluminum-based alloy into an arbitrary wheel shape using a means such as casting, forging, or the like, for the purpose of lightweightness and designability.

Examples of aluminum wheels also include those in which a shot-blasted irregular-shaped casting surface, a smooth surface obtained by cutting, and the like are mixed.

The aluminum members may have a surface that is chemical conversion-treated in advance using chromate, phosphate, or the like.

Further, the substrate may be a substrate in which an undercoating film, such as a primer coating film, a color base coating film, an edge clear coating film or the like are formed on the aluminum member.

Method for Forming Multilayer Coating Film

Step (1)

In this step, a colored coating film is formed by applying an undercoating composition (X) onto a substrate.

Undercoating Composition (X)

As the undercoating composition (X) to be applied to the substrate, it is possible to use a liquid coating composition containing a thermosetting resin component, as well as, as necessary, a solvent such as an organic solvent, a coloring pigment, an extender pigment, an effect pigment, a surface control agent, an antisettling agent, and the like. Specific examples of undercoating compositions in the method for forming a multilayer coating film of the present invention include a primer coating composition, a color base coating composition, and an edge clear coating composition.

Examples of thermosetting resin components include coating resin compositions known per se comprising (1) a base resin, such as a polyester resin, acrylic resin, vinyl resin, alkyd resin, or urethane resin containing a crosslinkable functional group, such as hydroxyl, and a hydrophilic functional group, such as carboxyl; and (2) a crosslinking agent, such as melamine resin or a blocked or non-blocked polyisocyanate compound.

The ratio of (1) the base resin and (2) the crosslinking agent is suitably such that the former is 40 to 90 mass %, and particularly 50 to 80 mass %, and the latter is 60 to 10 mass %, and particularly 50 to 20 mass % based on their total solids content.

The undercoating composition (X) may be applied onto a substrate using a method known per se, for example, air spray coating, airless spray coating, a rotary atomizing coating device or the like. Electrostatic application may be performed in these coating methods. The thickness of the coating film is preferably such that the cured film thickness is generally in a range of 10 to 100 μm, preferably 10 to 50 μm, and further preferably 15 to 35 μm.

Before the application of clear coating composition (Y), the undercoating film formed from undercoating composition (X) in step (1) is preferably adjusted so that the solids content ratio is in a range of 70 to 100 mass %, particularly 75 to 99 mass %, and further particularly 80 to 98 mass %.

In the adjustment of the solids content ratio, preliminary heating (preheating), air-blowing, and other means may be performed as necessary. The preheating temperature is preferably from room temperature to about 100° C., preferably about 40 to about 90° C., and further preferably about 60 to about 80° C. The preheating time is about 30 seconds to 15 minutes, preferably about 1 to 10 minutes, and further preferably about 3 to 5 minutes.

Step (2)

Onto the undercoating film formed from an undercoating composition in step (1), clear coating composition (Y) is subsequently applied. As clear coating composition (Y), the above-described coating composition of the present invention (the present coating composition) is applied.

The clear coating composition (Y) may be applied with a method known per se, for example, airless spray coating, air spray coating, a rotary atomizing coating device and the like. Electrostatic application may be performed in these coating methods. The thickness of the coating film is such that the cured film thickness is generally in a range of 10 to 60 μm, and preferably in a range of 25 to 50 μm.

Step (3)

The multilayer coating film thus formed of two layers, i.e., the undercoating film and the clear coating film, may be cured all at once by heating using a general coating film thermally curing means, such as hot air heating, infrared heating, or high-frequency heating at about 120 to about 160° C., and preferably about 125 to about 140° C. for about 20 to 40 minutes.

EXAMPLES

The present invention is described in more detail below with reference to Examples and Comparative Examples. However, the present invention is not limited to the following Examples. In the following Examples, "part(s)" and "%" are based on mass.

2-ethylhexyl acrylate, 32.5 parts of 2-hydroxyethyl methacrylate, 2.5 parts of acrylic acid, and 3 parts of di-tertiary-amylperoxide was added dropwise over 4 hours while maintaining the temperature at 150° C. at a constant speed using a dropping pump. After the dropwise addition was completed, the mixture was maintained for 1 hour at 150° C., and the stirring was continued. Thereafter, the mixture was cooled and diluted with a mixed solution of 8 parts of Swasol 1000 and 15 parts of n-butanol, thereby obtaining an acrylic resin (A1) solution having a solids content of 65%. The obtained acrylic resin (A1) had a weight-average molecular weight of 10000, a hydroxy value of 140 mgKOH/g, an acid value of 20 mgKOH/g, a glass transition temperature of 14° C., and a solubility parameter of 9.1.

Production Examples 2 and 4

Solutions of acrylic resins (A2) to (A4) were obtained in the same synthesis as in Production Example 1, except that monomer components in the proportions shown in Table 1 were used. Table 1 shows the weight-average molecular weights, hydroxy values, acid values, glass transition temperatures, and solubility parameters of acrylic resins (A1) to (A4) thus obtained, as well as the formulations of monomers.

TABLE 1

| | | Examples | | | | | | | | | | | |
|---|---|---|---|---|---|---|---|---|---|---|---|---|---|
| | | 1 | 2 | 3 | 4 | 5 | 6 | 7 | 8 | 9 | 10 | 11 | 12 |
| Clear Coating Composition (Y-) | | 1 | 2 | 3 | 4 | 5 | 6 | 7 | 8 | 9 | 10 | 11 | 12 |
| Acrylic Resin (A1) | | 70 | | 70 | 60 | 70 | 70 | 70 | 70 | 70 | 70 | 70 | 70 |
| Acrylic Resin (A2) | | | 70 | | | | | | | | | | |
| Acrylic Resin (A3) | | | | | | | | | | | | | |
| Acrylic Resin (A4) | | | | | | | | | | | | | |
| Melamine Resin (B1) | | 30 | 30 | | 40 | 30 | 30 | 30 | 30 | 30 | 30 | 30 | 30 |
| Melamine Resin (B2) | Note 1 | | | 30 | | | | | | | | | |
| Silica Particles (C1) | Note 2 | 10 | 10 | 10 | 10 | | | 10 | 10 | 10 | 18 | 10 | 10 |
| Silica Particles (C2) | Note 3 | | | | | 10 | | | | | | | |
| Silica Particles (C3) | Note 4 | | | | | | 10 | | | | | | |
| Silica Particles (C4) | Note 5 | | | | | | | | | | | | |
| Silica Particles (C5) | Note 6 | | | | | | | | | | | | |
| Polyolefin Wax (D1) | Note 7 | 10 | 10 | 10 | 10 | | | | | | 10 | 4 | 14 |
| Polyolefin Wax (D2) | Note 8 | | | | | | | | 10 | | | | |
| Polyolefin Wax (D3) | Note 9 | | | | | | | | | 10 | | | |
| Polyolefin Wax (D4) | Note 10 | | | | | | | | | | 10 | | |
| Polyolefin Wax (D5) | Note 11 | | | | | | | | | | | | |
| Polyolefin Wax (D6) | Note 12 | | | | | | | | | | | | |
| Polyolefin Wax (D7) | Note 13 | | | | | | | | | | | | |
| Polyolefin Wax (D8) | Note 14 | | | | | | | | | | | | |
| BYK-300 | | 0.1 | 0.1 | 0.1 | 0.1 | 0.1 | 0.1 | 0.1 | 0.1 | 0.1 | 0.1 | 0.1 | 0.1 |
| Results of Performance Test | Dry Cloth Abrasion Resistance (Scratch Resistance) | S | A | A | S | S | S | A | A | A | A | A | A |
| | Coating Film Appearance | S | S | S | S | A | A | A | A | A | A | A | A |
| | Corrosion Resistance | S | A | A | A | S | S | S | S | S | A | S | S |

Production of Acrylic Resin (A)

Production Example 1

30 parts of Swasol 1000 (Maruzen Petrochemical Co., Ltd.) was placed in a glass four-necked flask equipped with a thermometer, a stirrer, a condenser tube, and a water separator, and heated to 150° C. under stirring while blowing nitrogen gas. The temperature was then maintained. Thereafter, a mixture containing 20 parts of styrene, 13 parts of isobornyl acrylate, 12 parts of n-butyl acrylate, 20 parts of Production of Clear Coating Composition Example 1

108 parts (solids content=70 parts) of acrylic resin (A1) solution obtained in Production Example 1, 60 parts of melamine resin (B1) (butyl-etherified melamine resin, weight-average molecular weight=4000, active component=50%), 10 parts of silica particles (C1) (Note 2), 10 parts of polyolefin wax (D1) (Note 7), and 0.2 parts of BYK-300 (trade name; BYK-Chemie, surface control agent, active component=52%) were evenly mixed and Swasol 1000 (trade name; Shell chemicals Japan, aromatic hydrocarbon-based solvent) was further added thereto, thereby obtaining clear coating composition (Y-1) having a viscosity of 22 seconds as measured by Ford cup No. 4 at 20° C.

Examples 2 to 12 and Comparative Examples 1 to 12

The same method as in Example 1 was performed according to the formulations of coating compositions shown in Table 2, thereby obtaining clear coating compositions (Y-2) to (Y-24) having a viscosity of 22 seconds as measured by Ford cup No. 4 at 20° C.

Clear coating compositions (Y-13) to (Y-24) were used as Comparative Examples.

The formulations of coating compositions to obtain clear coating compositions (Y-1) to (Y-24) shown in Table 2 are based on solids content.

Notes 1 to 14 in Table 2 are shown below.

Note 1: Melamine resin (B2): Butyl-etherified melamine resin, weight-average molecular weight=2200, active component=60%

Note 8: Polyolefin wax (D2): CERAFLOUR913 (polypropylene wax, average particle size=18 μm, melting point=160° C., produced by BYK)

Note 9: Polyolefin wax (D3): CERAFLOUR915 (polypropylene wax, average particle size=34 μm, melting point=160° C., produced by BYK)

Note 10: Polyolefin wax (D4): PropyMatte31 (polypropylene wax, average particle size=10 μm, melting point=160 to 170° C., MICRO POWDERS, INC.)

Note 11: Polyolefin wax (D5): CERAFLOUR970 (polypropylene wax, average particle size=9 μm, melting point=160° C., produced by BYK)

Note 12: Polyolefin wax (D6): CERAFLOUR917 (polypropylene wax, average particle size=42 μm, melting point=135° C., produced by BYK)

Note 13: Polyolefin wax (D7): Ceridust 3620 (polyethylene wax, average particle size=7.5 to 9.5 μm, melting point=122 to 127° C., Clariant Chemicals)

Note 14: Polyolefin wax (D8): DYNEON TF9205 (polytetrafluoroethylene wax, average particle size=7.5 to 9.5 μm, melting point=325° C., DYNEON)

TABLE 2

| | | Comparative Examples | | | | | | | | | | | |
|---|---|---|---|---|---|---|---|---|---|---|---|---|
| | | 1 | 2 | 3 | 4 | 5 | 6 | 7 | 8 | 9 | 10 | 11 | 12 |
| Clear Coating Composition (Y-) | | 13 | 14 | 15 | 16 | 17 | 18 | 19 | 20 | 21 | 22 | 23 | 24 |
| Acrylic Resin (A1) | | | | 70 | 70 | 70 | 70 | 70 | 70 | 70 | 70 | 70 | 70 |
| Acrylic Resin (A2) | | | | | | | | | | | | | |
| Acrylic Resin (A3) | | 70 | | | | | | | | | | | |
| Acrylic Resin (A4) | | | 70 | | | | | | | | | | |
| Melamine Resin (B1) | | 30 | 30 | 30 | 30 | 30 | 30 | 30 | 30 | 30 | 30 | 30 | 30 |
| Melamine Resin (B2) | Note 1 | | | | | | | | | | | | |
| Silica Particles (C1) | Note 2 | 10 | 10 | | | 10 | 10 | 10 | 10 | 4 | 22 | 10 | 10 |
| Silica Particles (C2) | Note 3 | | | | | | | | | | | | |
| Silica Particles (C3) | Note 4 | | | | | | | | | | | | |
| Silica Particles (C4) | Note 5 | | | | 10 | | | | | | | | |
| Silica Particles (C5) | Note 6 | | | | | 10 | | | | | | | |
| Polyolefin Wax (D1) | Note 7 | 10 | 10 | 10 | 10 | | | | | 10 | 10 | 2 | 16 |
| Polyolefin Wax (D2) | Note 8 | | | | | | | | | | | | |
| Polyolefin Wax (D3) | Note 9 | | | | | | | | | | | | |
| Polyolefin Wax (D4) | Note 10 | | | | | | | | | | | | |
| Polyolefin Wax (D5) | Note 11 | | | | | | 10 | | | | | | |
| Polyolefin Wax (D6) | Note 12 | | | | | | | 10 | | | | | |
| Polyolefin Wax (D7) | Note 13 | | | | | | | | 10 | | | | |
| Polyolefin Wax (D8) | Note 14 | | | | | | | | | | | | |
| BYK-300 | | 0.1 | 0.1 | 0.1 | 0.1 | 0.1 | 0.1 | 0.1 | 0.1 | 0.1 | 0.1 | 0.1 | 0.1 |
| Results of Performance Test | Dry Cloth Abrasion Resistance (Scratch Resistance) | A | C | A | A | B | A | B | B | A | B | B | A |
| | Coating Film Appearance | S | S | C | C | B | C | B | B | C | C | A | B |
| | Corrosion Resistance | C | A | A | A | A | A | A | A | S | B | S | A |

Note 2: Silica particles (C1): SYLOID 161W (average particle size=6 μm, produced by GRACE GMBH)

Note 3: Silica particles (C2) Mizukasil P-526 (average particle size=3 μm, Mizusawa Industrial Chemicals, Ltd.)

Note 4: Silica particles (C3): Tokusil U (average particle size=13 μm, produced by Maruo Calcium Co., Ltd.)

Note 5: Silica particles (C4): AEROSIL200 (average particle size=0.01 μm, produced by EVONIK)

Note 6: Silica particles (C5): Tokusil GU-N (average particle size=17.8 μm, produced by Maruo Calcium Co., Ltd.)

Note 7: Polyolefin wax (D1): CERAFLOUR914 (polypropylene wax, average particle size=24 μm, melting point=160° C., produced by BYK)

TABLE 3

| | Production Examples No. | | | |
|---|---|---|---|---|
| | 1 | 2 | 3 | 4 |
| Acrylic Resin | A1 | A2 | A3 | A4 |
| Styrene | 20 | 12 | 6 | 33 |
| Isobornyl Acrylate | 13 | 10 | 13.5 | 10 |
| N-butyl Acrylate | 12 | | | 5.5 |
| 2-ethylhexyl Acrylate | 20 | 33.5 | 28 | 28 |
| 2-hydroxyethyl Methacrylate | 32.5 | 42 | 50 | 21 |
| Acrylic Acid | 2.5 | 2.5 | 2.5 | 2.5 |
| Weight-average Molecular Weight | 10000 | 10000 | 10000 | 10000 |

TABLE 3-continued

|  | Production Examples No. | | | |
| --- | --- | --- | --- | --- |
|  | 1 | 2 | 3 | 4 |
| Acrylic Resin | A1 | A2 | A3 | A4 |
| Hydroxy Value (mgKOH/g) | 140 | 181 | 216 | 91 |
| Acid Value (mgKOH/g) | 20 | 20 | 20 | 20 |
| Glass Transition Temperature (° C.) | 14 | 6 | 13 | 13 |
| Solubility Parameter | 9.1 | 9.0 | 9.1 | 9.0 |

Production of Test Plates (Method for Forming Coating Film)

An aluminum casting material (AC4C) was subjected to zirconium-based chemical conversion (CT3796; Nihon Parkerizing Co., Ltd.), and Magicron AL-2500 Black (acrylic melamine-based coating composition, Kansai Paint Co., Ltd.) was applied as a color base with a film thickness of 15 μm and left at room temperature for 2 minutes. Subsequently, each clear coating composition obtained in Examples and Comparative Examples was applied with a film thickness of 30 μm and cured by heating at 140° C. for 20 minutes, thereby obtaining a test plate.

The obtained test plates were evaluated by performing tests according to the following criteria. Table 2 also shows the results of these performance tests.

Dry Cloth Abrasion Resistance (Scratch Resistance)

Using a friction tester (Suga Test Instruments Co., Ltd.), an abrasion test was performed for 200 rounds at a load of 1 kg using 5-layered gauzes without using a test liquid. The gloss of each test plate was visually confirmed before and after the test, and each test plate was evaluated according to the following criteria depending on the change in gloss. The grade "A" or higher was regarded as an acceptable level.
S: Almost no change was observed.
A: A slight change was observed.
B: An apparent change was observed.
C: A significant change was observed.

Corrosion Resistance

A cut was made in each test plate to carry out a CASS test according to JIS Z2371, and the test plate was evaluated according to the following criteria based on the width of rust 240 hours after the test. The grade "A" or higher was regarded as an acceptable level.
S: Width of rust was 1.5 mm or less.
A: Width of rust was more than 1.5 mm and not more than 3 mm.
B: Width of rust was more than 3 mm and not more than 5 mm.
C: Width of rust was more than 5 mm.

Coating Film Exterior

Each coated test plate was visually observed, and the test plate was evaluated according to the following criteria. The grade "A" or higher was regarded as an acceptable level.
S: An entirely even matte coating film was obtained.
A: The gloss was slightly uneven.
B: The gloss was clearly uneven.
C: A defect such as seeding was present in the coating surface or the degree of the matte effect was insufficient.

The invention claimed is:

1. A method for forming a multilayer coating film, comprising sequentially performing following steps (1) to (3):
   (1) applying undercoating composition (X) to form an undercoating film;
   (2) applying, as clear coating composition (Y), a coating composition onto the undercoating film formed in step (1) to form a clear coating film; and
   (3) thermally curing the undercoating film and the clear coating film formed in steps (1) and (2) all at once,
   wherein the coating composition comprises acrylic resin (A) having a hydroxy value of 100 to 200 mgKOH/g; melamine resin (B), silica particles (C) having an average particle size of 1.0 to 15 μm; and polyolefin wax (D) having an average particle size of 10 to 40 μm and a melting point of 145° C. to 180° C.,
   wherein the coating composition comprises 5 to 20 mass % of silica particles (C) and 3 to 15 mass % of polyolefin wax (D) based on the total solids content of acrylic resin (A) and melamine resin (B), and
   wherein the clear coating film has a cured film thickness in a range of about 10 to 60 μm.

2. An article comprising a coating film of a coating composition comprising acrylic resin (A) having a hydroxy value of 100 to 200 mgKOH/g; melamine resin (B); silica particles (C) having an average particle size of 1.0 to 15 μm; and polyolefin wax (D) having an average particle size of 10 to 40 μm and a melting point of 145° C. to 180° C., the coating composition comprising 5 to 20 mass % of silica particles (C) and 3 to 15 mass % of polyolefin wax (D) based on the total solids content of acrylic resin (A) and melamine resin (B)., wherein the coating film has a cured film thickness in a range of about 10 to 60 μm.

* * * * *